July 10, 1962   L. H. KEATON   3,042,940
MULTIPURPOSE INFLATABLE SEAT CUSHION
Filed Feb. 15, 1961
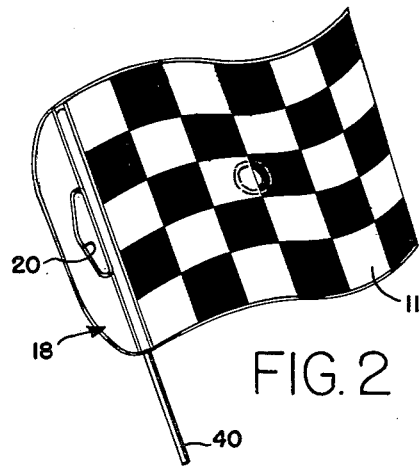
FIG. 2
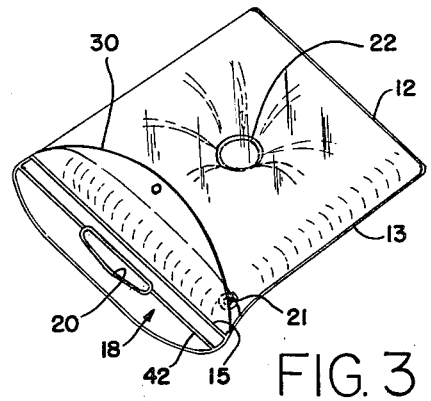
FIG. 3
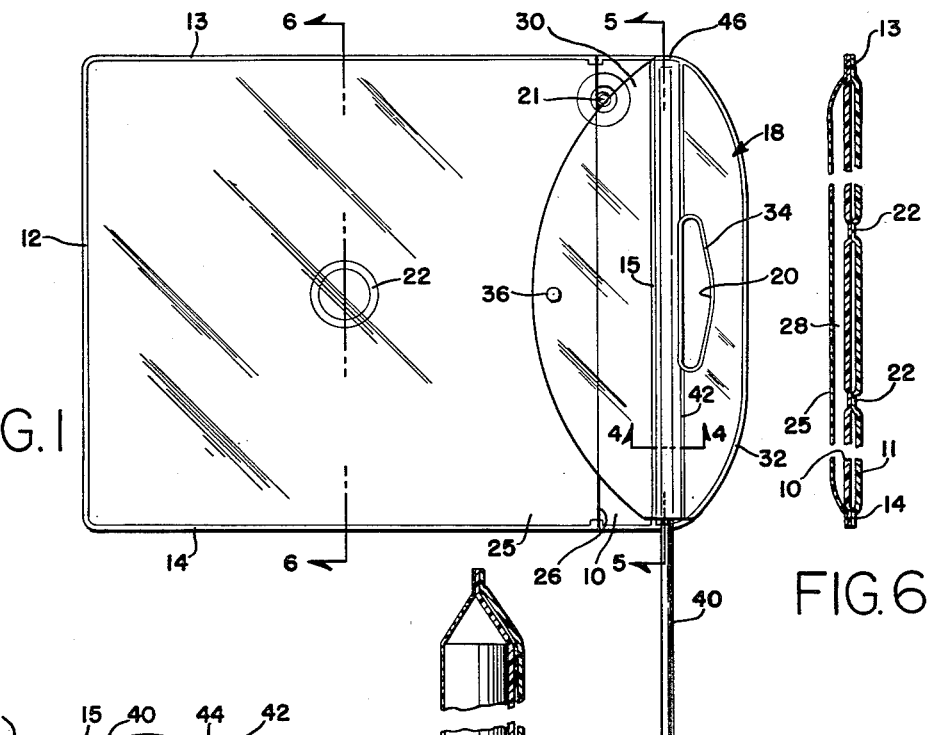
FIG. 1
FIG. 6
FIG. 4
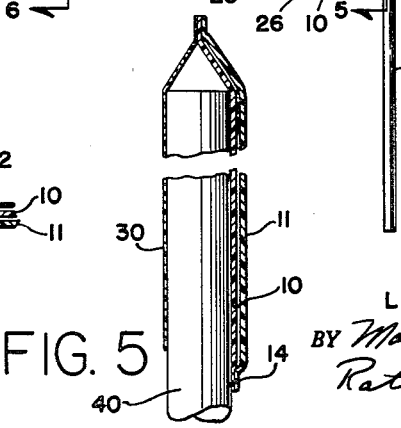
FIG. 5
*INVENTOR.*
LESTER H. KEATON
BY Mason, Kolisainen,
Rathburn & Wyss
ATTORNEY

United States Patent Office 3,042,940
Patented July 10, 1962

3,042,940
MULTIPURPOSE INFLATABLE SEAT CUSHION
Lester Harold Keaton, 5904 N. Oxford, Indianapolis, Ind.
Filed Feb. 15, 1961, Ser. No. 89,500
5 Claims. (Cl. 5—348)

The present invention relates to seat cushions, and, more particularly, to seat cushions of the inflatable type which are provided with valve means whereby the cushion may be inflated when desired to be used as a cushion and may be deflated so that they may be stored or carried in a flat condition.

At many sporting events and the like it is customary to sell ornamented flags or pennants which are waved by the spectators during the course of the proceedings. Also, at such events it is convenient to provide seat cushions of the inflatable type which may be conveniently carried in a deflated condition and may be inflated by the user and used to sit on while viewing the event. It is a primary object of the present invention to provide a device which may be used as a seat cushion when it is in an inflated condition and may be used as a flag or pennant when it is in a deflated condition so that a spectator need purchase only one item to perform both functions.

It is another object of the present invention to provide a new and improved seat cushion of the inflatable type which can be used in its deflated condition as a handbag for carrying miscellaneous articles and which is also provided with facilities for using the device as a flag when it is in a deflated condition.

Briefly, in accordance with one aspect of the present invention a pair of flexible top and bottom cushion members are sealed together at the edges thereof to provide an inflatable cushion having valve means whereby air may be forced between the members to inflate the cushion. An outer layer of flexible material is sealed at its edges to one of the cushion members and has an opening therein to provide an article receiving pocket between said outer layer and one of the cushion members. In addition, a pair of parallel closely spaced seams are provided adjacent a handle portion of the cushion member so as to provide an elongated narrow slot between the outer layer and one cushion member, said slot extending along one edge of said cushion and having one end thereof closed and the other end thereof open to receive a flagstaff so that the seat cushion may be waved as a flag when in a deflated condition.

The invention, both as to its organization and method of operation, together with further objects and advantages thereof, will best be understood by reference to the specification taken in conjunction with the accompanying drawings in which:

FIG. 1 is a top plan view of the multipurpose inflatable cushion of the present invention shown in its deflated condition;

FIG. 2 is a perspective view of the multipurpose cushion of FIG. 1 showing the manner in which said cushion may be used as a flag or pennant when in the deflated condition;

FIG. 3 is a perspective view of the cushion of FIG. 1 showing the cushion in its inflated condition and with the flagstaff removed;

FIG. 4 is a sectional view taken along the lines 4—4 of FIG. 1;

FIG. 5 is a sectional view taken along the lines 5—5 of FIG. 1; and

FIG. 6 is a sectional view taken along the lines 6—6 of FIG. 1.

Referring now to the drawing, the multipurpose inflatable seat cushion of the present invention is therein shown as comprising a flexible top cushion member 10 and a flexible bottom cushion member 11. Preferably the members 10 and 11 are formed of a suitable plastic material which may be heat sealed at the edges thereof to provide a suitable inflatable cushion. More particularly, the members 10 and 11 are heat sealed together by means of the peripheral seams 12, 13 and 14 and a seam 15 which extends across the upper portion of the members 10 and 11, the portion of the members 10 and 11 above the seam 15 forming a handle portion indicated generally at 18 which is provided with an opening 20 so that the device may be readily carried in either its deflated or inflated condition. The top cushion member 10 is provided with a suitable valve means 21 therein which may be selectively opened as desired by the user so that the space between the members 10 and 11 may be filled with air, thus causing the cushion to be inflated and assume the form shown in FIG. 3. In addition, the members 10 and 11 are preferably sealed together by means of the annular seam 22 at the center of the cushion so that a generally doughnut shape is provided for the cushion in its inflated condition, thereby preventing the cushion from blowing up like a balloon when it is inflated.

In order that the cushion of the present invention may be used as a suitable receptacle for carrying miscellaneous articles when it is in a deflated condition, an outer layer 25 of flexible material is secured to the top cushion member 10 on three sides thereof, the remaining side 26 of the outer member 25 being unsealed so as to provide an article receiving pocket 28 (FIG. 6) between the outer member 25 and the top cushion member 10. Preferably, the outer member 25 is made of a clear plastic material so that the articles within the pocket 28 may be readily seen. It will also be noted that the outer layer 25 is not secured to the cushion member 10 at the annular center seam 22 so that relatively large articles may be received within the pocket 28.

In order to provide a flap closure for the pocket 28, there is provided a second outer layer of flexible material 30 which is secured to the top cushion member 10 by means of the seam 15 and is also secured to the cushion member 10 by means of the outer seam 32 which is employed to hold the handle portions of the cushion members 10 and 11 together, as well as the seam 34 which is employed to hold these members together at the edge of the handle opening 20. However, the portion of the outer member 30 to the left of the seam 15 as viewed in FIG. 1 is left free so as to provide a flap closure for the pocket 28, there being provided a suitable snap fastener 36 whereby the flap closure 30 may be secured to the outer member 25 so as to retain articles within the pocket 28.

In accordance with an important feature of the invention, there is provided means defining an elongated narrow slot between the outer layer 30 and the cushion member 10, said slot being adapted to receive a flagstaff 40 therewithin so that the cushion may be waved as a flag when in a deflated condition. More particularly, a seam 42 is provided which extends parallel to the seam 15 and is closely spaced thereto so as to provide a narrow elongated slot 44 (FIG. 4) which is adapted to receive the upper end of the flagstaff 40. Preferably, the width of the slot 44 is such that the flagstaff 40 is tightly received within the slot 44 so that the cushion may be waved quite vigorously as a flag in the manner shown in FIG. 2 without the cushion becoming detached from the flagstaff 40. The upper end of the slot 44 is closed by means of a seam 46 and the bottom end of the slot 44 is open so that the flagstaff 40 may be inserted thereinto.

Preferably the cushion member 11 is imprinted with a suitable ornamental design, such as shown in FIG. 2, which may be applied by any suitable silk screening process or the like, so that an attractive ornamental flag or pennant is provided.

While a particular embodiment of the invention has been described, it will be understood that many modifications will become apparent to those skilled in this art and it is, therefore, contemplated by the appended claims to cover any such modifications that fall within the spirit and scope of the appended claims.

What is claimed as new and is desired to be secured by Letters Patent of the United States is:

1. An inflatable multipurpose seat cushion, comprising flexible top and bottom cushion members sealed together at the edges thereof to provide an inflatable cushion, valve means in one of said cushion members whereby air may be forced between said members to inflate the cushion, an outer layer of flexible material sealed at its edges to one of said cushion members, said outer layer having an opening therein to provide an article receiving pocket between said outer layer and said one cushion member, and means defining an elongated narrow slot between said outer layer and said one cushion member, said slot extending along one edge of said cushion and having one end thereof closed and the other end thereof open to receive a flagstaff so that said seat cushion may be waved as a flag when in a deflated condition.

2. An inflatable multipurpose seat cushion, comprising flexible top and bottom cushion members sealed together at the edges thereof to provide an inflatable cushion, valve means in one of said cushion members whereby air may be forced between said members to inflate the cushion, a first outer layer of flexible material sealed along three sides thereof to one of said cushion members, to provide an article receiving pocket between said first outer layer and said one cushion member, a second outer member sealed to the other edge of said cushion member and formed to provide a flap closure for said pocket, and means defining an elongated narrow slot between said second outer member and said one cushion member, said slot extending across one side of said flap closure and having one end thereof closed and the other end thereof open to receive a flagstaff which projects beyond the edge of said seat cushion so that said seat cushion may be waved as a flag when in a deflated condition.

3. An inflatable multipurpose seat cushion, comprising flexible top and bottom cushion members sealed together at the edges thereof to provide an inflatable cushion, valve means in one of said cushion members whereby air may be forced between said members to inflate the cushion, said cushion members each having a portion extending beyond one sealed edge thereof to form a handle portion, a first outer layer of flexible material sealed along three sides thereof to one of said cushion members to provide an article receiving pocket between said first outer layer and said one cushion member, a second outer member extending over said handle portion and sealed thereto, said second outer member being formed to provide a flap closure for said pocket, and means defining an elongated narrow slot between said second outer member and the handle portion of said one cushion member, said slot extending across one side of said flap closure and having one end thereof closed and the other end thereof open to receive a flagstaff which projects beyond the edge of said seat cushion so that said seat cushion may be waved as a flag when in a deflated condition.

4. An inflatable multipurpose seat cushion, comprising flexible top and bottom cushion members sealed together at the edges thereof to provide an inflatable cushion, valve means in one of said cushion members whereby air may be forced between said members to inflate the cushion, said cushion members each having a portion extending beyond one sealed edge thereof to form a handle portion, a first outer layer of flexible material sealed along three sides thereof to one of said cushion members to provide an article receiving pocket between said first outer layer and said one cushion member, the unsealed edge of said outer layer being adjacent said handle portion, a second outer member extending over said handle portion and sealed thereto, said second outer member being formed to provide a flap closure for said pocket, and means defining an elongated narrow slot between said second outer member and the handle portion of said one cushion member, said slot extending across one side of said flap closure and having one end thereof closed and the other end thereof open to receive a flagstaff which projects beyond the edge of said seat cushion so that said seat cushion may be waved as a flag when in a deflated condition.

5. An inflatable multipurpose seat cushion, comprising flexible top and bottom cushion members sealed together at the edges thereof to provide an inflatable cushion, valve means in one of said cushion members whereby air may be forced between said members to inflate the cushion, said cushion members each having a portion extending beyond one sealed edge thereof to form a handle portion, a first outer layer of flexible material sealed along three sides thereof to one of said cushion members to provide an article receiving pocket between said first outer layer and said one cushion member, a second outer member positioned over said handle portion and connected thereto by means of a first seam adjacent the unsealed edge of said first outer layer, said second outer member being formed to provide a flap closure for said pocket, and a second seam connecting said second outer member and said one cushion member and extending parallel to said first seam to provide a narrow elongated slot between said second outer member and the handle portion of said one cushion member, said slot extending across one side of said flap closure and having one end thereof closed and the other end thereof open to receive a flagstaff which projects beyond the edge of said seat cushion so that said seat cushion may be waved as a flag when in a deflated condition.

References Cited in the file of this patent

UNITED STATES PATENTS

| 748,271 | Estes | Dec. 29, 1903 |
| 1,870,535 | Stellmacher | Aug. 9, 1932 |

FOREIGN PATENTS

| 5,137 | Great Britain | Dec. 14, 1878 |